US008565398B2

(12) United States Patent
Hillier et al.

(10) Patent No.: US 8,565,398 B2
(45) Date of Patent: Oct. 22, 2013

(54) INTELLIGENT CALLING PATTERN RECOGNITION AND ADAPTIVE USER DIALING INTERFACE

(75) Inventors: Peter Matthew Hillier, Ottawa (CA); Paul Andrew Erb, Ottawa (CA)

(73) Assignee: Mitel Networks Corporation, Ottawa, Ontario (CA)

(*) Notice: Subject to any disclaimer, the term of this patent is extended or adjusted under 35 U.S.C. 154(b) by 49 days.

(21) Appl. No.: 13/317,962

(22) Filed: Oct. 31, 2011

(65) Prior Publication Data
US 2012/0069981 A1 Mar. 22, 2012

Related U.S. Application Data (63) Continuation-in-part of application No. 11/770,435, filed on Jun. 28, 2007, now Pat. No. 8,059,810.

(51) Int. Cl.
*H04M 3/42* (2006.01)
(52) U.S. Cl.
USPC ............ 379/201.01; 379/211.02; 379/212.01; 379/93.23
(58) Field of Classification Search
USPC ................ 379/201.01, 211.02, 212.01, 93.23
See application file for complete search history.

(56) References Cited

U.S. PATENT DOCUMENTS

| | | | |
|---|---|---|---|
| 5,412,713 A | 5/1995 | Baals et al. | |
| 5,790,652 A | 8/1998 | Gulley et al. | |
| 5,917,905 A | 6/1999 | Whipple et al. | |
| 6,075,851 A | 6/2000 | Pinard | |
| 6,453,179 B1 | 9/2002 | Larson | |
| 6,539,208 B1* | 3/2003 | Mori ........................ | 455/575.3 |
| 6,816,589 B2 | 11/2004 | Pinard | |
| 6,989,820 B1 | 1/2006 | Baker et al. | |
| 7,676,498 B2 | 3/2010 | England et al. | |
| 2003/0103165 A1 | 6/2003 | Bullinger et al. | |
| 2005/0170863 A1 | 8/2005 | Shostak | |
| 2006/0128437 A1 | 6/2006 | Kim | |
| 2007/0042764 A1 | 2/2007 | Peon et al. | |
| 2007/0218956 A1 | 9/2007 | Nieminen | |
| 2007/0281747 A1 | 12/2007 | Pletikosa et al. | |
| 2008/0063171 A1 | 3/2008 | Ho et al. | |

FOREIGN PATENT DOCUMENTS

| | | |
|---|---|---|
| CN | 1430850 A | 7/2003 |
| DE | 102004046856 A1 | 4/2006 |
| WO | WO 01/91457 A1 | 11/2001 |
| WO | WO 2005/112408 A1 | 11/2005 |
| WO | WO 2006/034919 A1 | 4/2006 |

* cited by examiner

*Primary Examiner* — Quynh Nguyen (57) ABSTRACT

A method of configuring a telephone, comprising configuring a plurality of self-labeling role keys to represent respective user roles, and configuring a plurality of self-labeling role associated keys associated with respective ones of the self-labeling role keys such that upon user selection of one of the self-labeling role keys representing a predetermined user role, the plurality of self-labeling role associated keys are presented to the user for invoking respective features associated with the selected user role. The method incorporates end user behavior patterns to collect programmable key data for the system to automatically update dynamic programmable keys, in conjunction with role associated keys or role independent keys.

6 Claims, 7 Drawing Sheets

INTELLIGENT CALLING PATTERN RECOGNITION AND ADAPTIVE USER DIALING INTERFACE

REFERENCE TO RELATED APPLICATIONS

This disclosure is a continuation-in-part of U.S. patent application Ser. No. 11/770,435 titled ROLE-BASED PROGRAMMABLE TELEPHONE KEYS that was filed on Jun. 28, 2007 now U.S. Pat. No. 8,059,810 to Paul Andrew Erb, which is hereby incorporated by reference in its entirety.

TECHNICAL FIELD

This disclosure relates generally to communication systems, and more particularly to the presentation of information on a telephone appliance.

BACKGROUND

U.S. Pat. No. 6,816,589 (Pinard) sets forth a communication system wherein a plurality of user data files are provided for respective users, each user data file including at least one role identifier; a plurality of communication groups having respective group name identifiers for associating predetermined roles with the groups and respective group phone numbers; and a role list data file for automatically associating respective ones of the users with a predetermined one or more of the communication groups according to their role identifiers.

U.S. Pat. No. 6,075,851 (Pinard) sets forth a communication system with a database representing a plurality of relationships of organization roles, including names of first persons filling the roles, names of temporary persons to fill at least some specific roles, directory numbers associated with respective ones of the first and temporary persons, and call features associated with respective specific roles. In response to a request to complete a call to a particular directory number associated with one of the specific roles, a method is disclosed for looking up in the database an alternative directory number of the person temporarily associated with the specific role, and processing the call to the alternate directory number instead of the particular directory number, but with call features associated with the specific role.

From the foregoing, it is known in the prior art that a telephone set user can perform multiple roles within an organization, and that those roles can change throughout the course of a typical business day. These roles can include: managerial responsibilities; participation in a committee or working group; consultant or subject matter expert; parent/spouse/friend; team organizer; and many other roles.

It is also known in the art for such a person to use programmable keys on their telephone to make/receive calls and invoke related features. However, such making/receiving of calls and invoking of features is done without consideration to which role the user is filling. Since the number or programmable keys presented on a telephone set is limited, the user typically only configures features, speed dial buttons, etc. that are most often used (or necessary) regardless of what role the user is filling.

It is possible to increase the number of available programmable keys on a telephone set by introducing tabs and other navigation elements to allow paging between groups of programmable keys. It is also possible for the user to decide which features, speed dial, etc. to configure, and then group them logically within the layout of programmable keys supported by the telephone set. Another option often used by secretarial/sub-attendants is to also use an adjunct programmable key module (PKM) to increase the available number of programmable keys.

However, in the context of a user filling multiple roles, the increase in number of available programmable keys increases the complexity of user selection of a feature related to a role. For example, important programmable keys may not be available when desired, as a result of having a different tab visible (i.e. managerial DN/line appearance/etc.). Additionally, a 'Hot Desking' capability can be used to overlay the programmable keys associated with a particular role onto a telephone set (e.g. activated by user login to the phone). However, only programmable keys configured for the logged in user/role are available.

The information used to populate the programmable keys can come from one or a combination of administrator programming and end user programming. This must be frequently updated as needs change within a role and/or day to day tasks and responsibilities ebb and flow. A number actively called one week due to a particular task or work case can be infrequently called or not used at all in following weeks.

The number of times a phone number is called has nothing to do with programmable keys. This can force the user to utilize the available tools/apps to manually update the buttons. As shown above, the numbers can change over time, which requires reprogramming. The number to reach the person can change with time of day (home or office), requiring duplicate programmable keys and end user awareness of time. The user may not be reachable. The caller has no means of knowing this via the existing call log or programmable keys i.e. a presence app must be overlaid or integrated with the phone.

Beforehand, buttons were updated through manual programming via the phone interface or by a network administrator via a centralized interface. The key could be programmed by the user via a PC configuration tool. Using a more integrated approach, when returning a call via the call logs or when selecting a caller from the call logs, the phone could prompt the user to add the number as a speed dial/programmable key. Most recently, called lists or called logs can be used to find the last set of calls that have been dialed. The redial button has been overloaded in some phones to provide a list of the last set of calls that can be selected.

DETAILED DESCRIPTION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
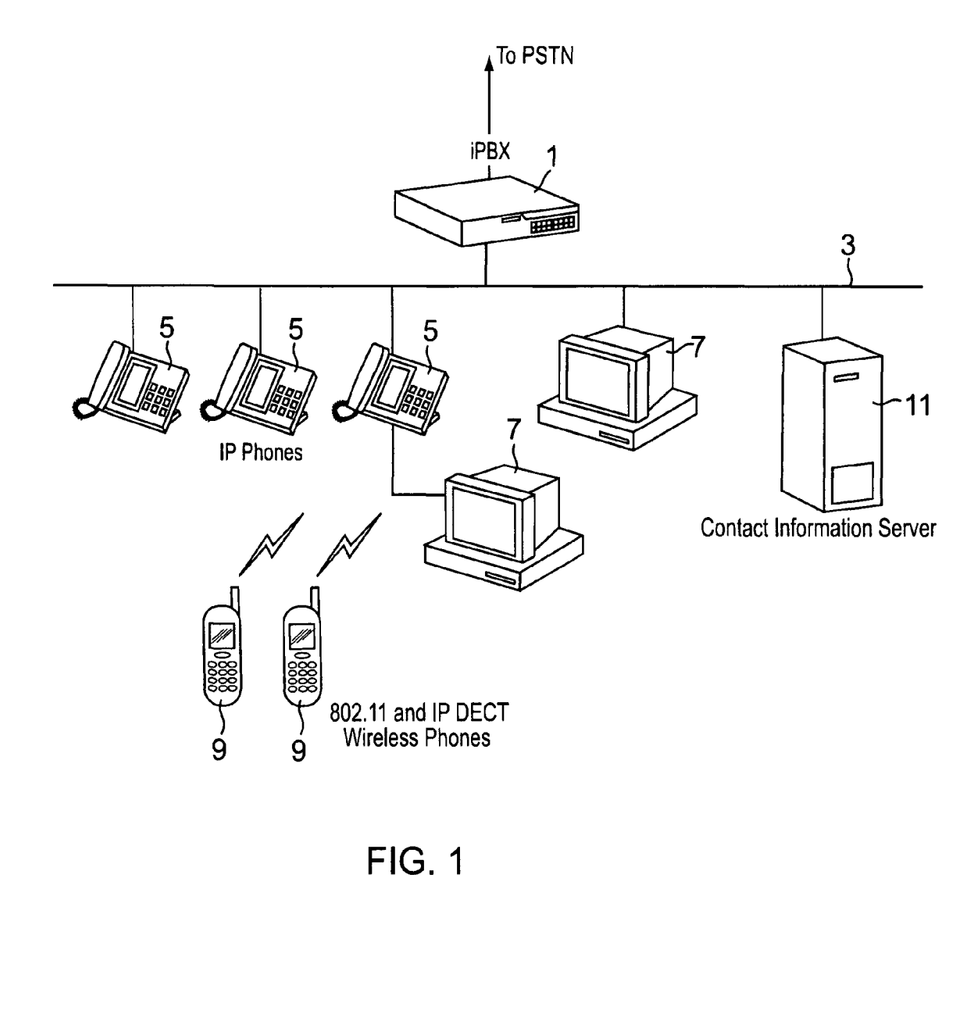
FIG. 1 is a block diagram of an exemplary communication system in accordance with one or more aspects of the present disclosure.

With reference to FIG. 1, an exemplary communication system is shown comprising a communication switch such as an IP PBX otherwise known as an iPBX 1 (e.g. Mitel 3300 ICP or Mitel SX-200 ICP) connected to a local area network (LAN 3) and to the public switched telephone network (PSTN). A plurality of telephone devices such as IP phones 5 and desktop computers 7 running phone applications, etc. are connected to the LAN 3, as well as wireless phones 9 and an application server 11, such as a contact information server. A person of skill in the relevant art will appreciate that the configuration of FIG. 1 is representative of a typical converged communication network, and that numerous variations in configuration, components, etc. are possible.

Figure 2:
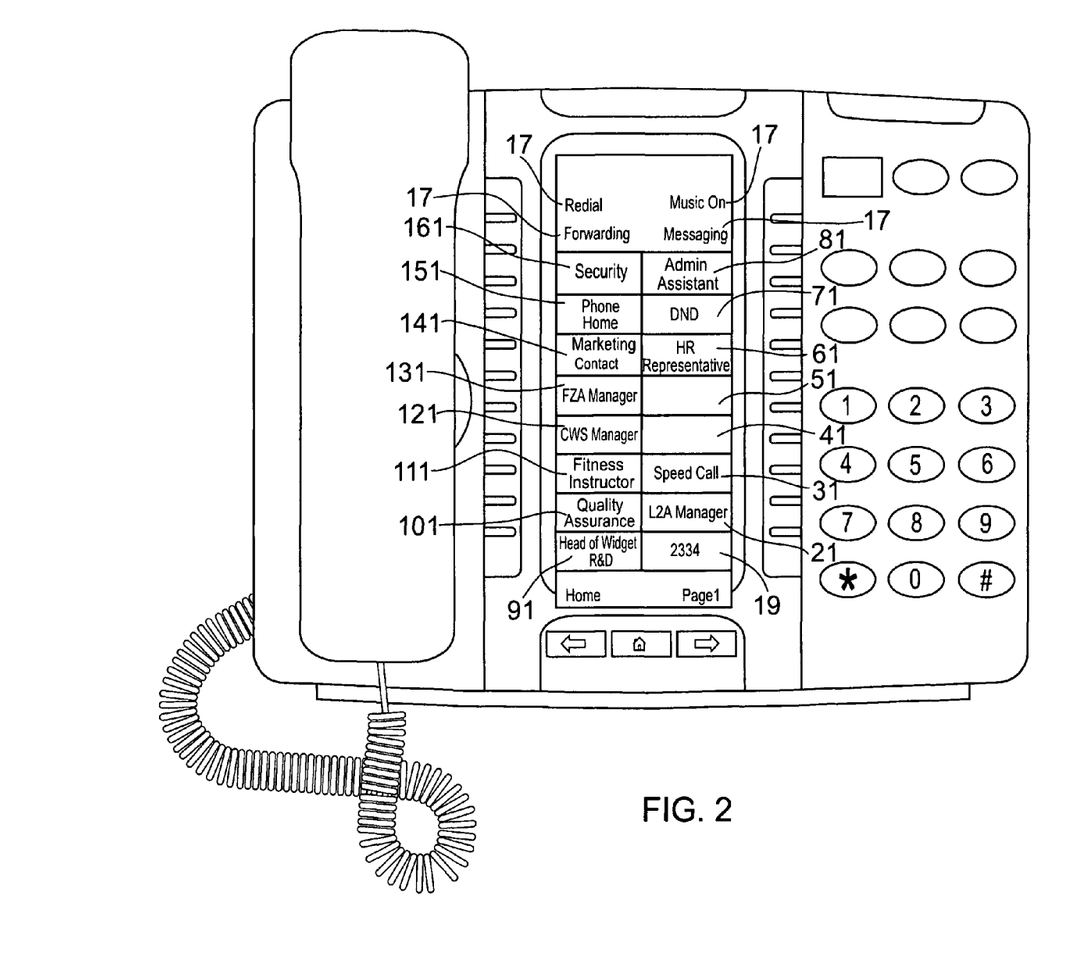
FIG. 2 shows an exemplary telephone appliance in accordance with one or more aspects of the present disclosure.

FIG. 2 shows an IP phone having a prime line key 19 representing the default 'role' for the user at extension 2334; four non-self-labeling keys 17 (for activating well known system features such as Redial, Forwarding, Music On and Messaging); and sixteen self-labeling programmable keys. The bottom six self-labeling programmable keys 19, 21, 31, 91, 101 and 111 are designated as role keys, the middle six keys 41, 51, 61, 121, 131 and 141 are designated as role associated keys, and the remaining (top) four keys 71, 81, 151 and 161 are designated as role independent keys. This designation can be specified in a role layout configuration that is specific to a given device/DN/user or is applied to all devices/DNs/users with the feature enabled. The actual numbers of keys can be any combination or order, system configuration selected or limited to a choice of specific combinations.

Table 1 shows an exemplary system configuration for assignment of role keys for an exemplary telephone system, wherein each "Button #" configured within the PBX corresponds to a "Key #" on the telephone set of FIG. 2.

TABLE 1

| Key # | Button # | Role Key Type |
|---|---|---|
| 21 | 2 | Role Key Allowed |
| 31 | 3 | Role Key Allowed |
| 41 | 4 | Role Associated Key |
| 51 | 5 | Role Associated Key |
| 61 | 6 | Role Associated Key |
| 71 | 7 | Role independent Key |
| 81 | 8 | Role independent Key |
| 91 | 9 | Role Key Allowed |
| 101 | 10 | Role Key Allowed |
| 111 | 11 | Role Key Allowed |
| 121 | 12 | Role Associated Key |
| 131 | 13 | Role Associated Key |
| 141 | 14 | Role Associated Key |
| 151 | 15 | Role independent Key |
| 161 | 16 | Role independent Key |

In the exemplary embodiment of FIG. 2, role keys 21, 31, 91, 101 and 111 can be selected by the user depending on what role the user is performing at any given time. Role keys can be existing DN/line appearances/speed calls/etc. and provide their existing behaviour in addition to causing presentation of associated role associated programmable keys, as set forth below.

For each selected role (except for the prime line), the user can configure role associated programmable keys 41, 51, 61, 121, 131 and 141 to perform certain functions that are useful for the selected role. Selection of a role key on the telephone set results in the normally configured programmable key behavior and additionally, overlays the selected role key's associated role associated keys on the designated programmable keys 41, 51, 61, 121, 131 and 141. Thus, for the embodiment of FIG. 2, wherein the 'Head of Widget R&D' role is active, role key 91 performs its usual function of a single line key, programmable keys 41 and 51 are blank (not programmed), key 61 is a speed call to 'HR Representative', key 121 is a speed call to 'CWS Manager', key 131 is a speed call to 'FZA Manager', and key 141 is a speed call to 'Marketing Contact'. The layout of role keys, role associated keys and role independent keys is configured from an allowed/supported choice of layouts (that can be specific to a particular telephone set's capabilities) or as a tailored layout based on user preference.

In addition to static configurations based on expected or planned usage, programmable key information can be dynamically configured by the system based on end user behavior patterns. In one embodiment, detection of behavior patterns can result in programmable key data being overlaid on the designated programmable keys of the telephone set. These can be role associated, role independent or, if considered purely to populate programmable keys, be entirely separate from roles all together. The system provides an adaptive interface that promotes names/numbers onto auto labeling keys, which then appear on readily accessible/noticeable screen. How the name/numbers are promoted can be reflective of frequently dialed numbers (calling patterns), time of day, presence (of the user and far end name/number) preferences, etc.

An algorithm can record the calling patterns of the user for incoming and outgoing communications such as telephone calls, MMS, SMS, etc. The connected party name can be cached along with the called party number, and time of day. When patterns can be detected and exceed a programmable threshold, they can be promoted to the common number application. For purposes of illustration, assume John calls Jane, his manager several times a day. When John looks at his phone, the primary interface (labeled keys, contact list, or a new common number app) contains an entry for "Jane". However, on weekends John never calls Jane, so the interface adapts and demotes "Jane", offering a set of contacts frequently dialed on weekends instead. Through this recognized pattern, the system can create self labeling keys, populate a special user interface and modify the existing user interface (contacts). Other meaningful changes to existing interfaces to denote frequently called parties can be implemented. The number of "common numbers" can be configurable, and entries can be limited based on this configuration.

Figure 7:
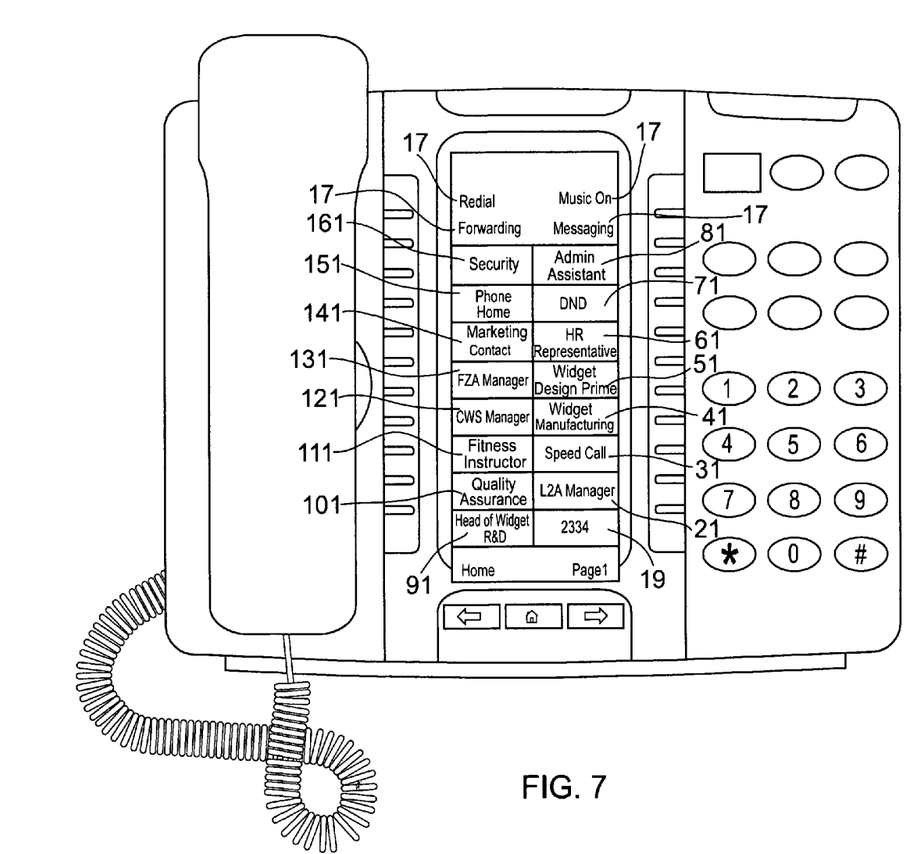
FIG. 7 is the telephone appliance of FIG. 2 running the common numbers application in accordance with one or more aspects of the present disclosure.

Role associated keys can be configured dynamically by the system. Shown in FIG. 7, the telephone appliance of FIG. 2 running the common numbers application is provided. Keys available for configuration can be identified as dynamic programmable keys either implicitly, by virtue of being unassigned or explicitly by system configuration. When programmable key data is collected dynamically, it can be assigned to keys that reflect the conditions where the data was collected. Specifically considering roles, when repeated user actions are performed during the selected role, this data can be used to populate the dynamic programmable key within the role associated keys. For example, when "Head of Widget R&D" role 91 is selected and if the user commonly calls "Widget Design Prime" and "Widget Manufacturing", the system can automatically assign these names and numbers to the dynamic programmable keys available in the "Head of Widget R&D" role associated keys 51 and 41, respectively. Typically, no end user programming is required. As the widget moves out of design and into verification, perhaps the user can begin calling "Widget Verification" more often, and so key 51 can be replaced or updated with "Widget Verification". The "Widget Design Prime" information can be moved to another programmable key, perhaps on another page/tab due to its now infrequent usage. Other programmable keys can be replaced. The rules associated with the collection, population, updating and retiring of programmable keys can be vast and many and are within the scope of the present disclosure.

Role-independent keys 71, 81, 151 and 161 can be programmed by the user for activation of Do Not Disturb (DND), Admin Assistant (speed call), Phone Home (speed call) and Security (speed call), in a well-known manner. Other keys on the telephone can exist and are not limited to those shown.

Table 2 shows a non-limiting example of a system configuration for assignment of role keys for the user 'Eldon Smith' at prime line extension 2334 on the exemplary telephone device of FIG. 2.

TABLE 2

Multiline Set 2334 (Edison Smith)

| Button | Label | Line Type | DN | Role Key Enabled | Associated Button and Role |
|---|---|---|---|---|---|
| 2 | L2A Manager | Key System | 2074 | Yes | Role Key Candidate (buttons 49-54) |
| 3 | Speedcall | Speedcall | 3423 | No | Role Key Candidate (buttons 55-60) |
| 4 | Peer Reviewer | Speedcall | 2335 | (blank - not allowed) | 4 - Default Role (2334) |
| 5 | Colleague | User Speedcall | (blank) | (blank - not allowed) | 5 - Default Role (2334) |
| 6 | Collaborator | User Speedcall | ******** | (blank - not allowed) | 6 - Default Role (2334) |
| 7 | Do Not Disturb | DND Feature | (blank) | (blank - not allowed) | Role Independent |
| 8 | Admin Assistant | Speedcall | 2335 | (blank - not allowed) | Role Independent |
| 9 | Head of Widget R&D | Single Line | 4279 | Yes | Role Key Candidate (buttons 61-66) |
| 10 | Quality Assurance | Key System | 2353 | Yes | Role Key Candidate (buttons 67-72) |
| 11 | Fitness Instructor | Single Line | 5123 | Yes | Role Key Candidate (buttons 73-78) |
| 12 | Team Leader | Key System | 2361 | (blank - not allowed) | 12 - Default Role |
| 13 | Team Manager | Speedcall | 2344 | (blank - not allowed) | 13 - Default Role |
| 14 | Marketing Contact | User Speedcall | ******** | (blank - not allowed) | 14 - Default Role |
| 15 | Home Phone | User Speedcall | ******** | (blank - not allowed) | Role Independent |
| 16 | Security | System Speedcall | 4444 | (blank - not allowed) | Role Independent |
| <Additional Pages of Programmable Keys i.e. 2 pages of 16 | | | | | |
| 49 | L2A Team Member 1 | Speedcall | 2378 | (blank - not allowed) | 4 - L2A Manager |
| 50 | L2A Team Member 2 | Speedcall | 2364 | (blank - not allowed) | 5 - L2A Manager |
| 51 | L2A Product Support | Speedcall | 3927 | (blank - not allowed) | 6 - L2A Manager |
| 52 | | Not assigned | (blank) | (blank - not allowed) | 12 - L2A Manager |
| 53 | | Not assigned | (blank) | (blank - not allowed) | 13 - L2A Manager |
| 544 | | Not assigned | (blank) | (blank - not allowed) | 14 - L2A Manager |
| 55 | | Not assigned | (blank) | (blank - not allowed) | 4 - (not available) |
| 56 | | Not assigned | (blank) | (blank - not allowed) | 5 - (not available) |
| 57 | | Not assigned | (blank) | (blank - not allowed) | 6 - (not available) |
| 58 | | Not assigned | (blank) | (blank - not allowed) | 12 - (not available) |
| 59 | | Not assigned | (blank) | (blank - not allowed) | 13 - (not available) |
| 60 | | Not assigned | (blank) | (blank - not allowed) | 14 - (not available) |
| 61 | | Not assigned | (blank) | (blank - not allowed) | 4 - Head of Widget R&D |
| 62 | | Not assigned | (blank) | (blank - not allowed) | 5 - Head of Widget R&D |
| 63 | HR Representative | User Speedcall | ******** | (blank - not allowed) | 6 - Head of Widget R&D |
| 64 | CWS Manager | Key System | 2312 | (blank - not allowed) | 12 - Head of Widget R&D |
| 65 | FZA Manager | Key System | 2368 | (blank - not allowed) | 13 - Head of Widget R&D |
| 66 | Marketing Contact | User Speedcall | ******** | (blank - not allowed) | 14 - Head of Widget R&D |
| 67 | | Not assigned | (blank) | (blank - not allowed) | 4 - Quality Assurance |
| 68 | | Not assigned | (blank) | (blank - not allowed) | 5 - Quality Assurance |
| 69 | | Not assigned | (blank) | (blank - not allowed) | 6 - Quality Assurance |
| 70 | | Not assigned | (blank) | (blank - not allowed) | 12 - Quality Assurance |
| 71 | | Not assigned | (blank) | (blank - not allowed) | 13 - Quality Assurance |
| 72 | | Not assigned | (blank) | (blank - not allowed) | 14 - Quality Assurance |
| 73 | | Not assigned | (blank) | (blank - not allowed) | 4 - Fitness Instructor |
| 74 | | Not assigned | (blank) | (blank - not allowed) | 5 - Fitness Instructor |
| 75 | | Not assigned | (blank) | (blank - not allowed) | 6 - Fitness Instructor |
| 76 | | Not assigned | (blank) | (blank - not allowed) | 12 - Fitness Instructor |
| 77 | | Not assigned | (blank) | (blank - not allowed) | 13 - Fitness Instructor |
| 78 | | Not assigned | (blank) | (blank - not allowed) | 14 - Fitness Instructor |

In Table 2, buttons 2-16 represent the configuration of self-labeling keys for the prime line default role, with additional pages of role associated keys 41, 51, 61, 121, 131 and 141 (corresponding to buttons 4, 5, 6, 12, 13 and 14, respectively) for each selected role of "L2A Manager" (role key 21, "Speed Call" (role key 31), "Head of Widget R&D" (active role key 91 shown in FIG. 2), "Quality Assurance" (role key 101) and "Fitness Instructor" (role key 111). The role associated keys can be programmed for the system or user speed call, key system or other function useful to the user's selected role.

As shown in Table 2, the PBX 1 preferably begins numbering of the additional keys after all other keys on the set (including PKM keys, if applicable), and as a result of configuration changes to the user-selected role layout or associated telephone set (button count) and PKM configuration.

Role associated keys 41, 51, 61, 121, 131 and 141 can be configured, similar to other programmable keys, using a desktop configuration or group admin tool (e.g. enterprise systems management (ESM)), which visually displays the association between a role key and its corresponding role associated keys. Alternatively, the user can configure the role associated keys using a settings shutter or similar application in the telephone 5 (that also clearly displays the association to the user).

As previously described, keys can also be dynamically configured by the system based on user behavior patterns. The position and contents of the keys can be defaulted via static configuration methods and be identified as dynamic programmable keys available to be over-ridden based on behavior patterns. Programmable keys can be identified as dynamic programmable keys and dynamically managed by the system within the set of role associated keys or as role independent keys.

A person of skill in the relevant art will appreciate that regardless of the method used in the configuration of the programmable keys, including those that are designated as role keys 21, 31, 91, 101 and 111 and role independent keys 71, 81, 151 and 161, additional pages/tabs of keys can continue to be supported using the existing configuration of programmable keys (as role independent keys) and numerically precede all role associated keys (e.g. the button numbering for the role associated keys of Table 2 begins with 49).

Navigation between pages/tabs of keys is not affected by the method used to populate the programmable keys values, nor the introduction of role associated keys that are available dependent on the "active" role. However, when navigation returns to the page/tab that contains the role keys and role associated keys, determination of which role associated keys are presented can be a result of a different "active" role than previously presented, or the values associated with the programmable keys can change based on recognized behavior pattern.

The role associated keys 41, 51, 61, 121, 131 and 141 for the prime line (key 19) of the telephone set can include the normally-configured programmable keys (i.e. not new role associated keys). By default, or after selecting the prime line 19, the normally-configured programmable keys are available as role associated keys (thereby maintaining existing telephone set behaviour).

When a different role key (21, 31, 91, 101 or 111) is selected, the corresponding role associated keys 41, 51, 61, 121, 131 and 141 effectively 'overlay' the normally-configured programmable keys on the telephone 5. This functionality is performed by a role management application (operative ideally in the telephone 5; alternatively as a proxy in the iPBX 1). The role management application can continually manage role associated keys as though these keys are always available physically on the telephone 5.

The labels/leds/behaviours associated with each role associated key 41, 51, 61, 121, 131 and 141 can be updated by the role management application to reflect the corresponding button number for the role associated key of the "active" role as selected by the user. An explicit/specific user action can optionally be involved, in addition to selecting a role key, prior to updating the role associated keys.

Additionally, the configuration of a colour associated with each role key label (e.g. as selected by the user in a settings shutter application) can be used by the role management application such that the background display colour for programmable key labels on the telephone set designated as role associated keys can be updated to match the "active" role key label (which can selectively display the colour background). The background colour of the role key label can optionally be altered to reflect activity that is occurring on role associated keys that are not displayed with the selected role, for example, by increasing hue and/or brightness. The same idea can be applied to dynamic programmable keys; when an action is detected that results in a programmable key be updated with the historically preferred user reaction. This can be altered to reflect behavior detection options, for example, altering color or increasing hue and/or brightness.

Figure 3:
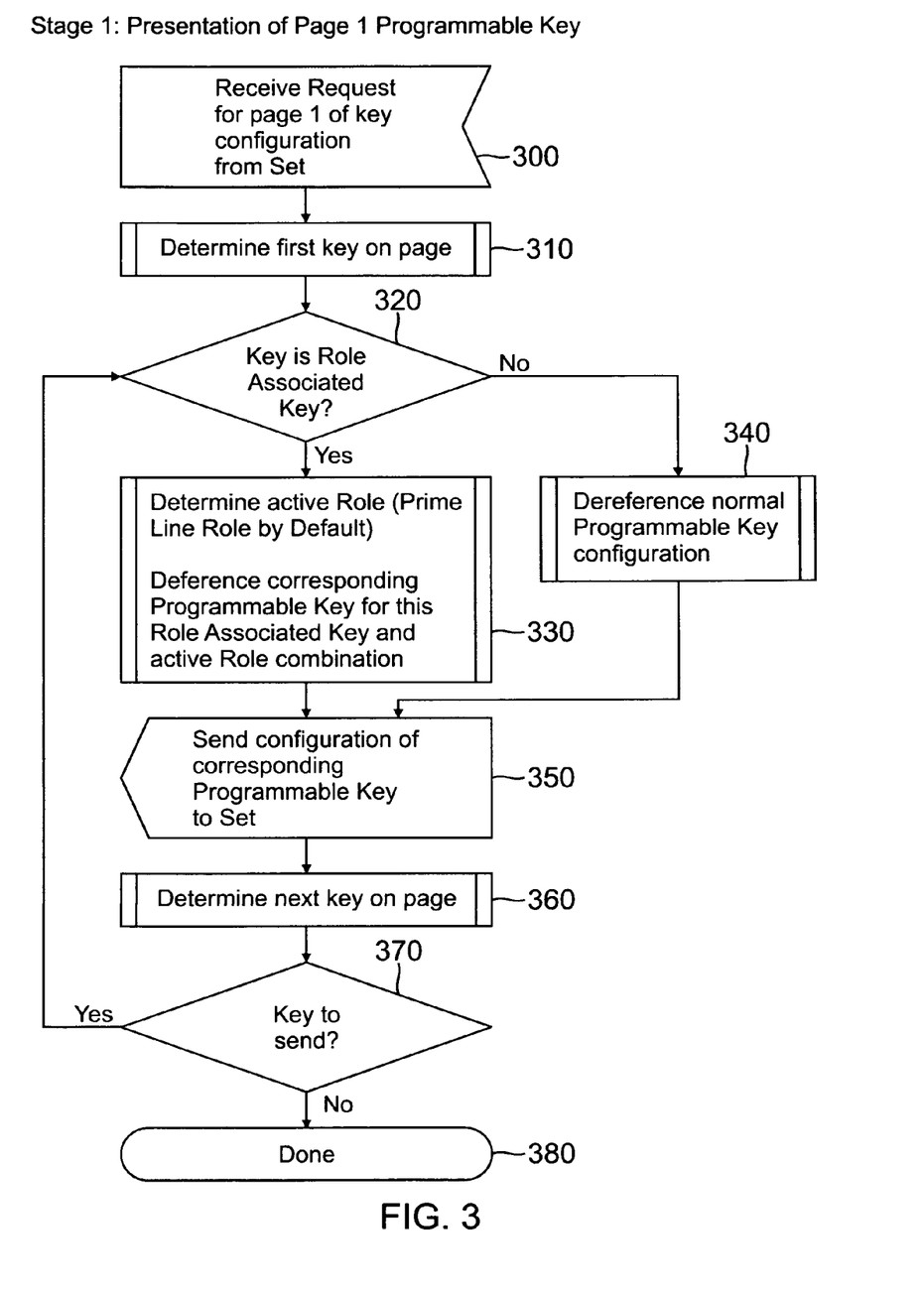
FIG. 3 is a flowchart showing processes for configuring programmable keys associated with a prime line of the telephone appliance of FIG. 2 in accordance with one or more aspects of the present disclosure.

Turning to FIG. 3, a flowchart for a portion of the role management application method sets forth processes for configuring programmable keys associated with the prime line key 19 of the exemplary telephone of FIG. 2. Upon receipt of a request for the first page (prime line) of key configurations from the telephone 5 (block 300), the application determines the first key on that page (block 310). If that key is a role associated key 41, 51, 61, 121, 131 or 141 (i.e. a "Yes" at block 320), the application determines the active role and dereferences the corresponding programmable key for the role associated key and active role combination (block 330). If the first key is not a role associated key (i.e. a "No" at block 320), then the application dereferences the normal programmable key configuration (block 340).

Next, at block 350, the application sends the configuration for the corresponding programmable key to the telephone. The application then determines the next key on the page (block 360), and if there is a key to send (i.e. a "Yes" at block 370), re-executes block 320. Otherwise, the method ends (block 380).

Figure 4:
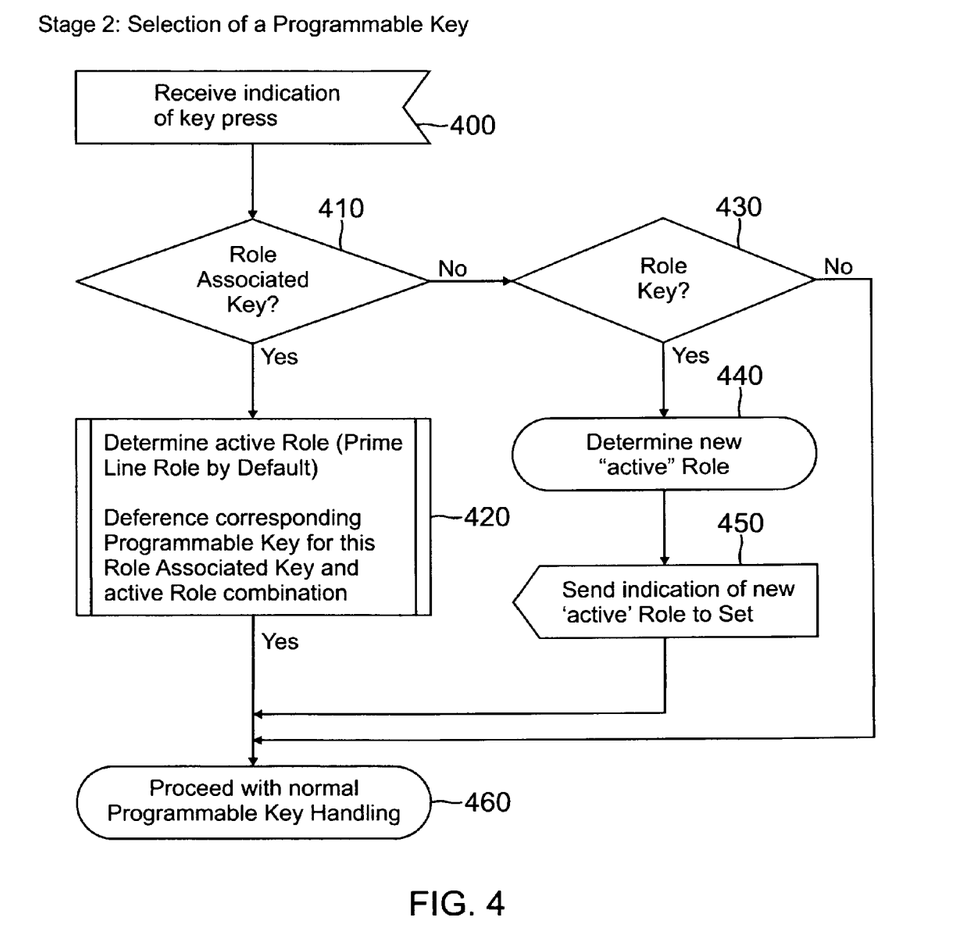
FIG. 4 is a flowchart showing processes responsive to a user selection of a programmed key at the telephone appliance of FIG. 2 in accordance with one or more aspects of the present disclosure.

FIG. 4 is a flowchart showing processes of the role management application responsive to a user selection of a programmed key at the exemplary telephone of FIG. 2. Upon receipt of a key press indication at the telephone (block 400), the application determines whether the pressed key is a role associated key (i.e. a "Yes" at block 410), in response to which the application determines the active role for the telephone and dereferences the corresponding programmable key for the pressed role associated key and role combination (block 420).

If the pressed key is not a role associated key (i.e. a "No" at block 410), the application determines whether the pressed key is a role key (block 430). If it is, the application determines the new active role (block 440) and sends an indication of the new active role to the telephone (block 450) and the method ends (block 460). If the pressed key is a role key (i.e. a "No" at block 430), the process simply ends (block 460).

Figure 5:
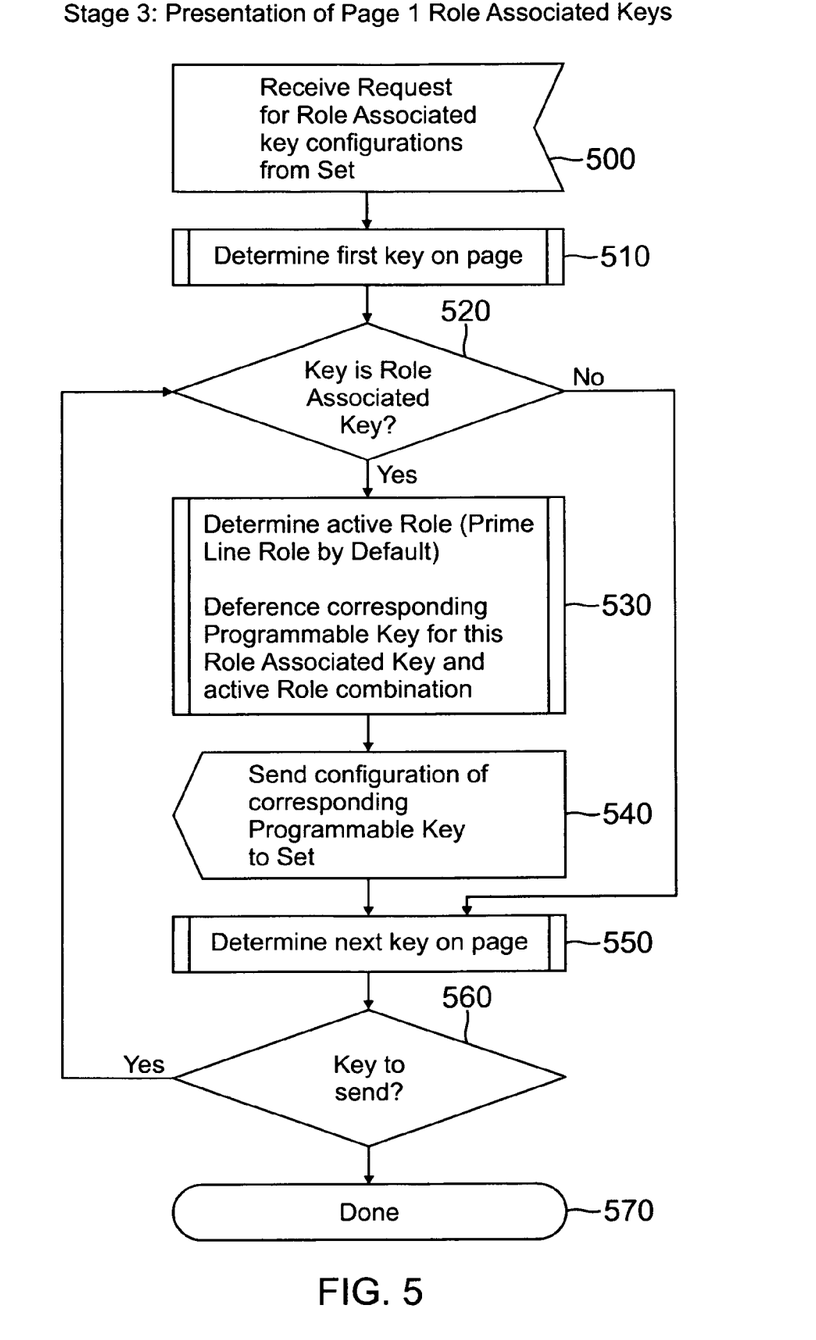
FIG. 5 is a flowchart showing processes for configuring role associated keys associated with an active role key of the telephone appliance of FIG. 2 in accordance with one or more aspects of the present disclosure.

FIG. 5 is a flowchart showing processes for configuring role associated keys associated with an active role key of the telephone shown in FIG. 2. Upon receipt of a request for role associated key configurations from the telephone 5 (block 500), the application determines the first key on that page (block 510). If that key is a role associated key 41, 51, 61, 121, 131 or 141 (i.e. a "Yes" at block 520), the application determines the active role and dereferences the corresponding programmable key for the role associated key and active role combination (block 530), and at block 540, sends the configuration for the corresponding programmable key to the telephone. If either the first key is not a role associated key (i.e. a "No" at block 520) or following execution of block 540, the application then determines the next key on the page (block 550), and if there is a key to send (i.e. a "Yes" at block 560), re-executes block 520. Otherwise, the method ends (block 570).

Figure 6:
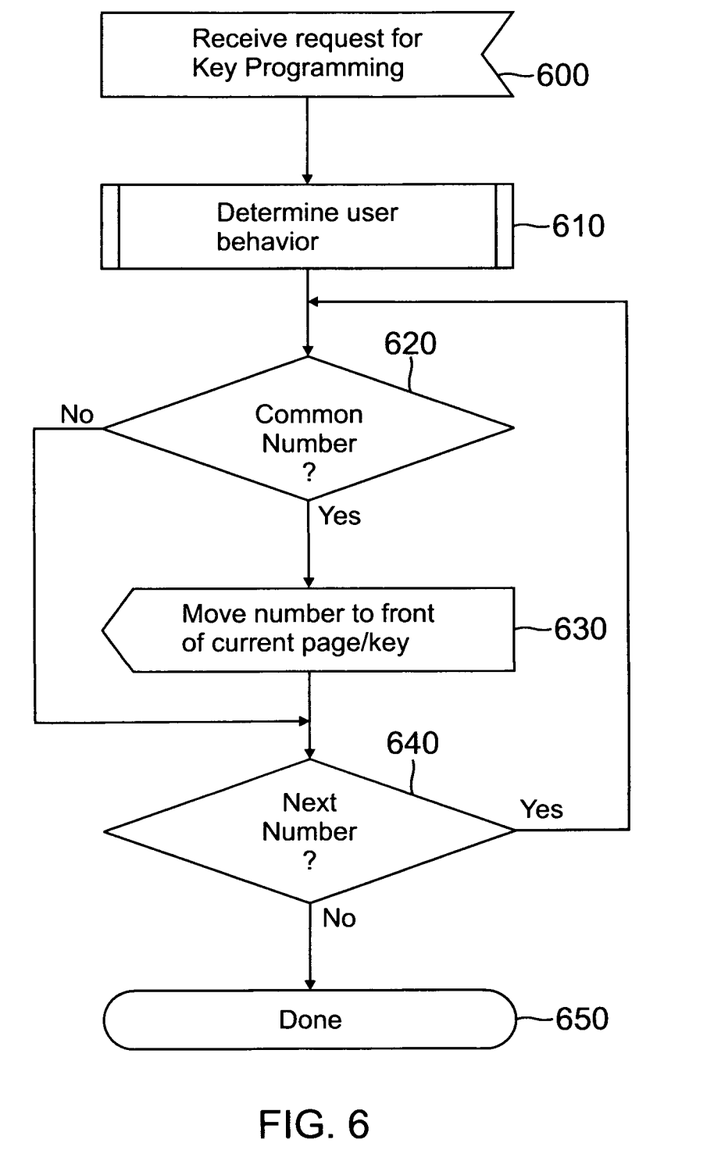
FIG. 6 is a flow chart showing processes for an application for populating the telephone appliance of FIG. 2 with intelligent calling pattern recognition in accordance with one or more aspects of the present disclosure.

Numbers can change over time, which requires reprogramming. The number to reach the person can change with time of day (home or office), which can require duplicate programmable keys and end user awareness of time. User behaviors can be learned by the system and used for dynamically programming keys, the name, number or feature code assigned to the key. The concept of a "most popular numbers" short cut can be added on phones with limited screen real-estate or limited programmable keys. This can provide a single button push access to common numbers. FIG. 6 is a flow chart showing processes for an application for populating the telephone appliance of FIG. 2 with intelligent calling pattern recognition. The application can be referred to as the common number application. The application can work with a telephone or other devices described above.

A request for key programming from the telephone can be received (block 600). The use of behavior patterns (block 610 where user behaviors are understood) can optimize the display of programmable keys such that minimal searching of multiple programmable key pages can be required. In one embodiment, a priority based scheme can be utilized such that programmable keys are assigned based on priority associated with a given role, time of day, behavior trigger or other event. When a behavior trigger occurs, the keys are not overwritten, rather they can be simply rearranged within the predefined limit of the number of programmable keys. In one embodiment, behavior learning can create programmable keys that can render obsolete unused or rarely used keys in favor of more popular numbers or actions.

Patterns can be developed for incoming and outgoing communications. In one embodiment, the more frequently a number is communicated with, the higher its importance rating and thus the more easily it can be to locate and dial that person/number via the phone interface (contact list, programmable speed calls (with programmable labels), or new interface). Caller activities can be further classified based on location (most frequently called numbers from home can be different than those at work), time of day (number of your spouse changes from day time (work) to evening (home or cell)), presence (during lunch, the work number for your spouse is replaced by cell number to improve reachability). Presentation of the role associated keys can be influenced by external factors as well as user actions (e.g. GPS coordinates, presence information, social media status).

If a number is not frequently used for incoming and outgoing communications, (i.e. a "No" at block 620), a next number is checked (block 640). When a number is common or frequently used (i.e. a "Yes" at block 620), that number is moved to the front of the current page/key (block 630) and the next number is checked (block 640). The processes can end (block 650) when there is there is no other number, (i.e. a "No" at block 640). Otherwise, the next number can be checked (block 620) when another number exists, (i.e. a "Yes" at block 640).

In one embodiment, features can be provided that involve the user, system or proxy during dynamic configuration of the programmable keys. For example, the common number application can query the user for confirmation when programming a key. A password and username can be requested by the application. Verifying the user can also be performed by a proxy or system. In addition, a programmable key to configure can be part of the query. An administrator or manager can record configuration changes for review after or before approving the changes.

The "Common Numbers" screen contains at most N numbers to facilitate ease of use. N, in one embodiment, can be ten. The N numbers are ranked by usage, or can be optionally locked in place (fixed) to insure order. When activating the phone directory, the common list can appear first, then break into alphabetical or user preferred ordering per normal contact applications. The common number list can self populate and label the programmable keys (name and number) or an application interface. The number associated with the frequently called device can also change depending on his preferred means of contact.

For purposes of illustration, and to further describe user behavior, if a user generally contacts his wife prior to leaving the office at 5:00 PM, a role independent programmable key can updated to his wife's name and contact number around this time of day. The key can also take on added characteristics mentioned early, such as a specific color, hue, and/or brightness to notify the user. While the key can exist in another tab/page, it can be moved to the front of the current page/tab. This can allow the user to conveniently locate the key without scrolling through the screen or tabs.

In another illustration, if the user tends to call his direct supervisor each time he receives a call from the customer crisis escalation hotline, a programmable key can immediately be updated with the direct supervisor information any time a call is received from the customer crisis hotline. In one embodiment, if the user tends to make frequent calls to a set of phone numbers (such as team members), programmable keys can be updated to reflect these numbers using the caller-id and connected party-id of the call (depending on whether calls are incoming or outgoing).

The concept of dynamic key programming can be directly associated with roles or be entirely independent thereof. Calling patterns can be determined with respect to a user's role. For example, the user above is more likely to call his direct supervisor in his employment role versus his wife. The programmable keys can be populated with the common numbers reflecting his employment when the appropriate user role is activated.

Dynamic programmable keys can store names, numbers, feature access codes, URLs, application launch commands and more. They can store the role that was associated with the action when the behavior took place. The keys can also associate a priority with the programmable key data such that behavior responses can be prioritized based on frequency of occurrence and allow keys to be presented in an order that reflects typical usage. Nested behaviors are possible and within the present scope of this disclosure.

Using the illustration described above, assume the user calls his wife each day at 5:00 PM to confirm a ride home. If there is no answer or is busy, the user can call a colleague to arrange for a ride home. The application can trigger on the busy signal or lack of connection state to further update the programmable key 51 with the colleagues' number, dropping the wife's contact lower in the list to key 41, or replacing it entirely, which presumably moves the wife's contact information back to its previous page and programmable key entry. Alternatively, using the priority scheme, at 5:00 PM, the programmable keys are updated with the wife's contact on key 51, followed by the colleagues' contact on key 41, simultaneously.

In operating with the role keys and role associated keys, the telephone device can detect communication patterns for user roles. Common numbers or parties for a role can be established through the patterns. Self-labeling role keys can be established for the user roles while self-labeling role associated keys can also be established. The self-labeling role associated keys can display the common numbers when a role key is activated. For each of the self-labeling role keys, the plurality of self-labeling role associated keys can be presented on the telephone as an overlay of the programmable feature keys configured for a prime line of the telephone device. In one embodiment, the self-labeling role associated keys can be updated when a new active user role is selected or the communication patterns for the new active user role changes. The patterns can be evaluated based on presence, location and time of day.

The present disclosure has been described with respect to a preferred embodiment. Other embodiments, variations and applications of the disclosure are possible. For example, the designation of role keys, role associated keys and role independent keys can be extended to additional user input mechanisms (in addition to telephone programmable keys). In addition to use for telephone sets with self-labeling programmable keys, the principle set forth herein can be applied to touch screen user input devices. Designations can also be applied on individual keys rather than on groups of keys. As well, the principles set forth herein can be applied to other devices (non-telephony) with a number of roles that can be user-selected resulting in associated context affected and context independent keys.

In addition to local telephony events on the device containing programmable keys, key updates and collection of data used to populate programmable keys can also be triggered by behaviors related to social media, calendar events, mobile integration and more. For example, a call dialed from a users' mobile device can appear on the programmable key for "redial" associated with a users fixed device. In one embodiment, the receipt of a message on the users' social media page can update a programmable key on the telephony device to launch the web browser and connect said social media site. A number of external triggers can result in dynamic updates to programmable keys on a users' device. Numerous types of communications can be used to determine user behavior and therefore, common numbers.

Typically, the number of programmable keys or entries in the common number list is set very low such that the end user can interpret the data quickly (i.e. less than 10). This can be alphabetical in order to assist with lookup. On occasions when the number is not found, the standard directory can be accessed, or additional pages of programmable keys can be accessed. The common number feature is simply meant to be the first level interface, not absolute, and is designed to be reflective of common calling patterns.

The keys can be integrated with presence, to denote if the user is available, or in a call, as well as with different numbers (home versus office). However, if presence is not used or available, the calling pattern time of day can provide home versus office number using the calling patterns. The granularity of time is configurable, and calling patterns can be automatically adapted and prioritized into those bins. For example, if there is only one time bin, time is not a factor. If two bins are created, it can be AM and PM, or the user can specify the boundary (e.g. 5:00 PM). The more bins that are created, the more adaptive the list can be to the time of day requirements (similar to programmable thermostats used to make home heating/cooling more efficient). In one embodiment, existing FMC and presence solutions can be incorporated to increase the success rate of reaching the called party.

In one embodiment, contact directories can incorporate those features presented above. For example, calling patterns within a group can be analyzed and adapted. If a caller X calls a help center several times and is referred to operator Y, the next time caller X connects and presses "1" to speak to an agent, this can be prioritized on Y's queue, instead of the general queue. Those skilled in the relevant art will appreciate that this can be implemented under those features set forth herein.

From a mobile device perspective, the layout of applications on the application screen is alphabetical to simplify searching, and these can be dragged to a common task bar or common screen based on user actions. This disclosure can be modified to place the common apps at the start of the alphabetical layout, or automatically create a shortcut on the frequently used app screen after the app has been used N times. The features can be applied to other devices (non-telephony) with a number of roles that can be user selected and associated context affected and context independent keys.

Dynamic programmable keys can be managed by a proxy application (e.g. iPhone® application) or as a negotiation between system/proxy and the user (e.g. the user is prompted/queried before changes are made. While disclosed embodiments described self labeling keys in conjunction with a telephone set, those features can be applied to IP telephony appliances or similar devices (specifically, mobile phones and tablets).

In one embodiment, the user behavior and determining communication patterns can be implemented in software and more particularly, decision logic. The logic can be provided in decision trees or the like. Those skilled in the relevant art will appreciate that there are numerous ways to implement decision logic. The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The many features and advantages of the disclosure are apparent from the detailed specification and, thus, it is intended by the appended claims to cover all such features and advantages of the disclosure that fall within the true spirit and scope of the disclosure. Further, since numerous modifications and changes will readily occur to those skilled in the relevant art, it is not desired to limit the disclosure to the exact construction and operation illustrated and described, and accordingly all suitable modifications and equivalents can be resorted to, falling within the scope of the disclosure.

What is claimed is:

1. In a telephone device having a plurality of programmable keys, a method for collecting programmable key data to configure said plurality of programmable keys comprising:

detecting communication patterns for user roles;

determining common parties involved in said communication patterns;

establishing a plurality of self-labeling role keys to represent said user roles; and establishing a plurality of self-labeling role associated keys corresponding with respective ones of said self-labeling role keys displaying said common parties;

wherein upon user selection of one of said self-labeling role keys, said selection representing a current active user role, said plurality of self-labeling role associated keys are presented to said user for invoking a call to one of said common parties associated with said current active user role, wherein for each of said self-labeling role keys said plurality of self-labeling role associated keys are presented on said telephone as an overlay of said programmable feature keys configured for a prime line of said telephone device.

2. The method for collecting said programmable key data to configure said plurality of programmable keys of claim 1, comprising updating said plurality of self-labeling role associated keys when a new active user role is selected.

3. The method for collecting said programmable key data to configure said plurality of programmable keys of claim 1, comprising updating said plurality of self-labeling role associated keys when said communication patterns change.

4. The method for collecting said programmable key data to configure said plurality of programmable keys of claim 1, wherein detecting communication patterns for user roles comprises evaluating calls based on at least one of presence, location and time of day.

5. The method for collecting said programmable key data to configure said plurality of programmable keys of claim 1, comprising prioritizing communication patterns into a plurality of bins defined by time.

6. The method for collecting said programmable key data to configure said plurality of programmable keys of claim 1, comprising displaying a name and number of one of said common parties next to said self-labeling role associated keys.

* * * * *